(12) United States Patent
Susemihl et al.

(10) Patent No.: US 12,529,614 B2
(45) Date of Patent: Jan. 20, 2026

(54) DEVICE AND METHOD FOR DETERMINING, IN AT LEAST THREE SPATIAL DIRECTIONS, A FORCE ACTING ON A BODY, AND METHOD FOR CONTROLLING THE MOVEMENT OF A BODY

(71) Applicant: NEURA ROBOTICS GMBH, Metzingen (DE)

(72) Inventors: Hendrik Susemihl, Hamburg (DE); David Reger, Metzingen (DE); Kevin Deutmarg, Hamburg (DE); Till Staude, Hamburg (DE)

(73) Assignee: NEURA ROBOTICS GMBH, Metzingen (DE)

( * ) Notice: Subject to any disclaimer, the term of this patent is extended or adjusted under 35 U.S.C. 154(b) by 355 days.

(21) Appl. No.: 18/029,434

(22) PCT Filed: Sep. 15, 2021

(86) PCT No.: PCT/EP2021/075307
§ 371 (c)(1),
(2) Date: Apr. 28, 2023

(87) PCT Pub. No.: WO2022/069224
PCT Pub. Date: Apr. 7, 2022

(65) Prior Publication Data
US 2023/0366761 A1    Nov. 16, 2023

(30) Foreign Application Priority Data
Sep. 30, 2020   (DE) ................ 102020125583.7

(51) Int. Cl.
*G01L 5/16* (2020.01)
*B25J 9/16* (2006.01)
(Continued)

(52) U.S. Cl.
CPC ............... *G01L 5/16* (2013.01); *B25J 13/085* (2013.01); *G01L 5/226* (2013.01)

(58) Field of Classification Search
CPC . G01L 5/16; G01L 1/005; G01L 1/122; G01L 25/00; G01L 5/226; G01L 5/228;
(Continued)

(56) References Cited

U.S. PATENT DOCUMENTS

| | | |
|---|---|---|
| 2009/0031825 A1 | 2/2009 | Kishida et al. |
| 2009/0044639 A1 | 2/2009 | Maekawa |
| 2020/0070354 A1* | 3/2020 | Nakayama ............ B25J 13/084 |

FOREIGN PATENT DOCUMENTS

| | | |
|---|---|---|
| DE | 102014114234 A1 | 3/2016 |
| DE | 102017008248 A1 | 3/2018 |

(Continued)

OTHER PUBLICATIONS

German office action issued May 6, 2021, in corresponding application DE 10 2020 125 583.7.
(Continued)

*Primary Examiner* — Brandi N Hopkins
(74) *Attorney, Agent, or Firm* — Nath, Goldberg & Meyer; Jerald L. Meyer; Stanley N. Protigal

(57) ABSTRACT

A device for determining, in at least three spatial directions, a force acting on a body includes at least one sensor element for attaching to the surface of the body, which element includes at least three individual sensor elements, each individual sensor element being designed to determine an individual force in one direction, or which includes at least one individual sensor element which is used to determine an individual force in three spatial directions, and an evaluation/control unit which records the individual force determined by each individual sensor element and is designed to calculate the force acting on the sensor element in at least
(Continued)

three spatial directions by projecting the individual forces onto a virtual point of the sensor element. A method for determining a force acting on a body in at least three spatial directions and a method for controlling the movement of a body is disclosed.

19 Claims, 5 Drawing Sheets

(51) Int. Cl.
  *B25J 13/08* (2006.01)
  *G01L 5/22* (2006.01)

(58) Field of Classification Search
  CPC ......... G01L 5/223; G01L 1/125; G01L 5/162; B25J 13/085; B25J 9/1674; B25J 9/1612; B25J 9/1633; G01P 15/18; G05B 19/423; G05B 19/42; B62K 3/002; G01B 11/16; G01B 21/04; G01B 11/007; G06F 3/03547; G06F 3/016; G05G 9/047
  See application file for complete search history.

(56) References Cited

FOREIGN PATENT DOCUMENTS

| | | |
|---|---|---|
| JP | 2006-275979 A | 10/2006 |
| JP | 2016205942 A | 12/2016 |
| JP | 2020-034428 A | 3/2020 |
| JP | 2020-071189 A | 5/2020 |

OTHER PUBLICATIONS

Office action h issued by the JPO on Nov. 5, 2024 for parallel pending Japanese patent application No. 2023-519699, with English translation.

* cited by examiner

DEVICE AND METHOD FOR DETERMINING, IN AT LEAST THREE SPATIAL DIRECTIONS, A FORCE ACTING ON A BODY, AND METHOD FOR CONTROLLING THE MOVEMENT OF A BODY

CROSS-REFERENCE TO RELATED APPLICATIONS

This is a National Phase Application filed under 35 U.S.C. 371 as a national stage of PCT/EP2021/075307, filed Sep. 15, 2021, an application claiming the benefit of German Application No. 10 2020 125 583.7, filed Sep. 30, 2020, the content of each of which is hereby incorporated by reference in its entirety.

FIELD

The invention relates to a device and a method for determining, in at least three spatial directions, a force acting on a body and a method for controlling the movement of a body.

BACKGROUND

To program and set up bodies, in particular manipulators such as industrial robots or cobots, these bodies must be moved manually by applying a force to the body itself or to a corresponding input device on the body. In many applications, the sensitivity or delicacy of the respective input device for executing the movement is a limiting factor. In addition, due to the measuring principle for detecting a force, current solutions have a sensitivity that depends on the position of the body.

Since manipulators often have various degrees of freedom, simultaneously controlling all these axes in interpolated Cartesian movements in all six degrees of freedom (X, Y, Z, Ry, Ry, Rz) is of great importance in order to make the programming process fast and intuitive. Current solutions have not yet been able to map this.

It is currently known to measure the motor currents required to move individual axles of a body, in particular a manipulator, and to calculate the torques present on the axles from this. By subtracting the required holding torques, changes caused by forces applied to the axes can be calculated and converted into subsequent movements. The disadvantage here, however, is that the forces applied to the body are measured only indirectly. Depending on the position of the body, in particular the manipulator, leverage effects of different magnitudes can arise, which distribute the sensitivity of the solution in a non-homogeneous manner across the working space.

Alternatively, it is also known to measure the torques on the respective axles directly using torque sensors installed in the axles and to convert changes in the torque which are caused by forces applied to the axles into subsequent movements. A disadvantage of this method, however, is that the forces applied to the body are only measured indirectly and, depending on the position of the body, in particular the manipulator, different leverage effects can arise. In addition, torque sensors must be attached to each axle, which can lead to high costs.

Furthermore, it is also known to attach 3D joysticks to the body in order to be able to carry out movements with limited degrees of freedom. However, only individual Cartesian directions can be controlled at the same time, which severely restricts the movement options.

SUMMARY

The object of the invention is therefore to provide a device and a method for determining, in at least three spatial directions, a force acting on a body, and, in particular, based thereon, a method for controlling a body, by means of which the forces applied to the body can be recorded in such a way that a learning or programming process of the body is made possible in a simple way.

The object of the invention is achieved by a device for determining, in at least three spatial directions, a force acting on a body, a method for determining, in at least three spatial directions, a force acting on a body, and a method for controlling the movement of a body.

The device according to the invention for determining, in at least three spatial directions, a force acting on a body, in particular a manipulator such as an industrial robot or a cobot, has at least one sensor element for attaching to the surface of the body, which comprises at least three individual sensor elements, with each individual sensor element being designed to determine an individual force in one direction, or which comprises at least one individual sensor element, which is designed to determine an individual force in three spatial directions, and further comprises an evaluation/control unit which records the individual force determined by each individual sensor element and is designed to calculate, in at least three spatial directions, the force acting on the sensor element by projecting the individual forces onto a virtual point of the sensor element. Since the sensor element is designed and suitable for being attached to the surface of the body, it is possible to directly measure the forces applied to the body, in particular directly at the point at which the force is applied. If exactly one sensor element is arranged on the surface of the body, the force acting on the sensor element corresponds to the force acting on the body.

When using individual sensor elements which are designed to determine an individual force in three spatial directions, a single individual sensor element is sufficient. When using individual sensor elements which are designed to determine an individual force in one direction, at least three individual sensor elements are arranged in one sensor element, with the directions in which the three individual sensor elements determine an individual force preferably being arranged perpendicularly to one another in order to be able to determine the force in three spatial directions in a simple manner.

Each sensor element preferably comprises a plurality of, preferably at least 15, particularly preferably at least 20, individual sensor elements, as a result of which the accuracy of the determination of the force acting on the sensor element can be increased.

The individual sensor elements are advantageously arranged in a grid or a polar arrangement, which can simplify the determination of the force acting on the sensor element. It is particularly important that the relative geometric arrangement of the individual sensor elements to one another be known.

In an advantageous development of the invention, the individual sensor elements of each sensor element have at least two groups of individual sensor elements which can be evaluated independently of one another. This allows for a redundant evaluation in order to be able to meet safety requirements.

The individual sensor elements of each group are preferably arranged in a grid or a polar arrangement, the grids or the polar arrangements preferably being arranged in an interlocking manner and being designed, for example, in the manner of a chess board. A particularly good redundancy can be achieved thereby.

According to a particularly advantageous embodiment of the invention, the device comprises at least two sensor elements which are preferably arranged at a distance from one another, particularly preferably on two opposite sides of the surface of the body. By using a plurality of sensor elements, it is possible to determine, in six spatial directions, the forces acting on the body, that is, the acting forces and torques, by combining the determined forces acting on the sensor elements in at least three spatial directions.

The sensor elements can preferably be evaluated independently of one another, as a result of which further redundancy can be achieved.

According to an advantageous development of the invention, the sensor element has a cover that is freely mounted relative to the sensor element. A cover of this kind can allow the forces acting on the sensor element to be determined in six spatial directions.

The sensor element is preferably made of a flexible material which can be applied to the body, in particular in the manner of a skin. A flexible material also allows the sensor elements to be attached to complex body geometries. Application in the manner of a skin has the advantage that the sensor elements can be arranged in a space-saving manner and, in addition, operation and handling can be simplified. A configuration of the sensor elements in the manner of an artificial, tactile skin allows for an intuitive and rapid programming, set-up, or learning process.

The evaluation/control unit advantageously includes a controller into which the force acting on the body can be introduced as an actual value. The controller enables the best possible conversion of the applied force into a corresponding subsequent movement of the body.

A body according to the invention, in particular a manipulator, preferably an industrial robot or cobot, has a device according to the invention, the at least one sensor element, preferably the at least two sensor elements, being arranged on the surface of the body. Attaching the sensor element to the surface of the body allows the force applied to be directly determined. In this case, the body can be moved manually in a simple manner for programming or for setting up or teaching movements by touching the body and displacing it in the desired directions by applying a force to the body itself.

According to a preferred development of the invention, a large number of sensor elements are arranged on the surface of the body, these covering in particular a large part of the surface, preferably the entire surface, of the body, with the sensor elements preferably being made of a flexible material which, in particular, can be applied to the body in the manner of a skin. If a large part of the surface of the body is covered with sensor elements, handling can be simplified and designed to be particularly intuitive.

The method according to the invention for determining, in at least three spatial directions, a force acting on a body, in particular a manipulator, for example an industrial robot or cobot, with at least one sensor element attached to the surface of the body, which element comprises at least three individual sensor elements, each individual sensor element for being designed to determine an individual force in one direction, or which comprises at least one individual sensor element which is designed to determine an individual force in three spatial directions, and an evaluation/control unit, has the steps:
- determining each individual force acting on each individual sensor element,
- calculating the force acting on the sensor element in at least three spatial directions by projecting the individual forces onto a virtual point of the sensor element.

Such a method allows the forces applied to the body to be measured directly, at least in three spatial directions, in particular directly at the point at which the force is applied.

According to an advantageous development of the method, at least two sensor elements are arranged on the surface of the body at a distance from one another, with the following steps being carried out:
- determining each individual force acting on each individual sensor element for each sensor element,
- calculating the force acting on the sensor element in at least three spatial directions by projecting the individual forces onto a virtual point of the sensor element for each sensor element,
- calculating the forces and torques acting on the body by projecting the forces acting on the sensor elements on a virtual point of the body, which in particular is spaced apart from the sensor elements, in particular from the measuring surface of the sensor elements.

Such a method enables a direct measurement of the forces applied to the body in six spatial directions, that is, the forces X, Y, Z and the torques Rx, Ry, Rz, in particular directly at the point at which the force is applied.

The forces acting on a body are advantageously determined independently of one another by means of two groups of individual sensor elements. This enables redundancy, which constitutes a safety function.

The method according to the invention is preferably further developed into a method for controlling the movement of a body, in particular a manipulator, for example an industrial robot or cobot, with the steps:
- determining the force acting on the body using a method according to the invention.
- introducing the force acting on the body as an actual value in a controller,
- comparing the actual value with a target value of the controller,
- determining a manipulated variable for movement control in order to achieve the target value.

A controller of this kind makes it possible to carry out a subsequent movement of the body, in particular in the direction of the acting force, based on an acting force that causes the actual value of the force to deviate from the target value of the force.

Disturbance variables are advantageously taken into account in the controller, as a result of which the desired movement can be carried out even in the event of disturbances.

The method according to the invention is preferably further developed into a method for controlling the movement of a body, in particular a manipulator, for example an industrial robot or cobot, with the steps:
- determining the force acting on the body using a method according to the invention,
- comparing the determined force with a predetermined minimum force value and/or a maximum force value,
- releasing the movement of the body if the determined force is greater than the minimum force value and/or smaller than the maximum force value.

Such a method enables a safety function such that the movement of the body is only carried out if certain conditions are met. In particular, safety-relevant release switches such as dead man's switches or confirmation switches can be implemented in this way.

The method according to the invention is preferably further developed into a method for controlling the movement of a body, in particular a manipulator, for example an industrial robot or cobot, with the steps:

determining the force acting on the body using a method according to the invention as a function of time, recognizing patterns of the force acting on the body for input and/or control commands.

Such a method allows input and/or control commands to be input to the evaluation/control unit. The patterns can have any force profile, for example tapping twice within a specified period of time, and can result in a pre-programmed command stored in the evaluation/control unit, for example saving the current position of the body, in particular the manipulator, or the operation release of accessories attached to the body, such as input keyboards or control panels.

BRIEF DESCRIPTION OF THE DRAWINGS

The invention is explained in detail using the exemplary embodiments illustrated in the following figures, in which.

DETAILED DESCRIPTION

Figure 1:
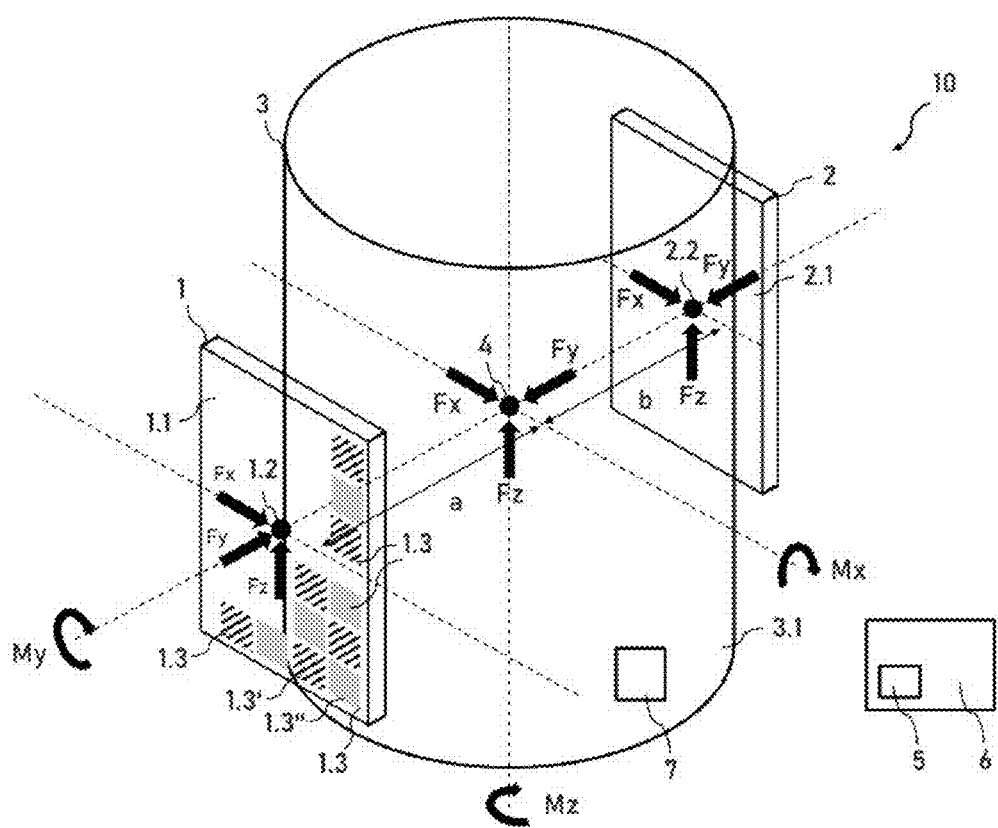
FIG. 1 is a schematic perspective representation of an embodiment of a device according to the invention with two sensor elements.

FIG. 1 is a schematic perspective representation of an embodiment of a device 10 according to the invention for determining, in at least three spatial directions Fx, Fy, Fz, a force F acting on a body 3 with at least one, in the present embodiment with two sensor elements 1, 2 for attaching to a surface 3.1 of the body 3, and an evaluation/control unit 6.

The body 3 shown can be a partial segment, for example an arm or a section of an arm, of a manipulator, for example an industrial robot or a cobot. The body 3 can have any conceivable shape and, of course, also have components that can be moved relative to one another. The body 7 comprises a drive unit 7, by means of which the body 7 can be moved either relative to other components or relative to the ground. For example, by means of the drive unit 7, the body 3 designed as a sub-segment of an arm of a manipulator can be rotated and/or tilted relative to a further sub-segment of the arm of the manipulator. The drive unit 7 can be actuated by means of the evaluation/control unit 6, which can be arranged either in or on the body 3 or can be designed as a separate unit.

The sensor elements 1, 2 each have a measuring surface 1.1, 2.1, which—as shown by way of example for the sensor element 1—comprises individual sensor elements 1.3. The individual sensor elements 1.3 are designed either to determine an individual force in one direction, generally perpendicular to the surface of the individual sensor element 1.3, or to determine an individual force in three spatial directions. When using an individual sensor element 1.3, which is designed to determine an individual force in three spatial directions, the sensor elements 1, 2 each have at least one of the individual sensor elements 1.3, preferably a plurality of individual sensor elements 1.3. When using individual sensor elements 1.3 which are designed to determine an individual force in one direction, the sensor elements 1, 2 each have at least three of the individual sensor elements 1.3, preferably a plurality individual sensor elements 1.3.

In a preferred, optional embodiment, the sensor elements 1, 2 have at least 15, for example 16 individual sensor elements 1.3 arranged in a 4×4 grid, particularly preferably at least 20, in the present exemplary embodiment 24. A larger number of individual sensor elements 1.3 can improve the resolution, regardless of whether the individual sensor element 1.3 determines the force in one or in three spatial directions.

The individual sensor elements 1.3 are preferably arranged in a grid or a polar arrangement, for example as shown in the figures in rows and columns with the same grid dimensions. In particular, it is essential to know the orientation of the individual sensor elements 1.3 relative to one another for the evaluation.

For each sensor element 1, 2, the force acting on the sensor element 1, 2 in three spatial directions Fx, Fy, Fz can be determined in such a way that a projection of the forces acting on the individual sensor elements 1.3 onto a virtual point 1.2, 2.2 of the sensor element 1, 2 is carried out, in particular by means of the evaluation/control unit 6. The virtual point 1.2, 2.2 in particular lies on the measuring surface 1.1, 2.1, for example centrally. By considering the position of one of the individual sensor elements 1.3 relative to the virtual point 1.2, 2.2 and evaluating the absolute amounts of the individual forces acting on the individual sensor elements 1.3, the force acting on the sensor element 1, 2, in particular at the virtual point 1.2, 2.2, can be determined in three spatial directions, that is, in particular the three force components Fx, Fy, Fz.

Each of the two sensor elements 1, 2 described above allows the force acting on the sensor element 1, 2 and thus also on the body 3 to be determined in three spatial directions.

In a method for determining, in at least three spatial directions, a force acting on the body 3, in particular a manipulator, with exactly one sensor element 1, 2 mounted on the surface 3.1 of the body 3, which element comprises at least three individual sensor elements 3.1, with each individual sensor element 1.3 being designed to determine an individual force in one direction, or which comprises at least one individual sensor element 1.3 which is designed to determine an individual force in three spatial directions, and an evaluation/control unit 6, the following steps can then be carried out: Firstly, each individual force acting on each individual sensor element 1.3 is determined. Then, the force acting on the sensor element 1, 2 in three spatial directions Fx, Fy, Fz is calculated by projecting the individual forces onto a virtual point 1.2, 2.2 of the sensor element 1, 2.

Through a combined evaluation of the two sensor elements 1, 2, which can be arranged on opposite sides of the surface 3.1 of the body 3, for example as shown in FIG. 1, the force acting on the body 3 can be determined in a simple manner, not only in three but in six directions in space, that is, the acting forces Fx, Fy, Fz and the acting torques Mx, My, Mz. The sensor elements 1, 2 can be arranged at a distance A from one another, with the sensor element 1 being able to have the distance a from a virtual point 4 of the body 3 and the sensor element 2 being able to have a distance b from the virtual point 4 of the body 3. The distance A preferably corresponds to the sum of the distances a and b. To determine the force acting on the body 3 in six spatial directions, the forces acting on the sensor elements 1, 2 are projected onto the virtual point 4 of the body 3, in particular by means of the evaluation/control unit 6. Since the virtual point 4 is not in the measuring surface 1.1, 2.1 of the sensor elements 1, 2, but at a distance from it, by considering the position of each of the individual sensor elements 1.3 relative to the virtual point 4 and evaluating the absolute values of the values of the individual forces acting on the individual sensor elements 1.3, in addition to the forces Fx, Fy, Fz acting in three spatial directions, the torques Mx, My, Mz acting around the axles can also be determined.

In a method for determining in at least three, preferably in six, spatial directions, a force acting on the body 3, in particular a manipulator, comprising at least two sensor elements 1, 2 spaced apart from one another on the surface 3.1 of the body 3, each of which has at least three individual sensor elements 3.1, with each individual sensor element 1.3 being designed to determine an individual force in one direction, or which each comprise at least one individual sensor element 1.3 which is designed to determine an individual force in three spatial directions, and an evaluation/control unit 6, the following steps can be carried out: Firstly, each individual force acting on each individual sensor element 1.3 is determined for each sensor element 1, 2. Then, the force acting on the sensor element 1, 2 is calculated in three spatial directions by projecting the individual forces onto a virtual point 1.2, 2.2 of the sensor element 1, 2. Finally, the forces Fx, Fy, Fz and torques Mx, My, Mz acting on the body 3 are calculated by projecting the forces acting on the sensor elements 1, 2 onto a virtual point 4 of the body 3, which is in particular spaced apart from the sensor elements 1, 2.

An alternative or additional possibility for determining the force acting on the body 3 not only in three but in six spatial directions is explained with reference to FIG. 4. The sensor element 1 shown there differs from the sensor element 1 shown in FIG. 1 in that it has a cover 1.4 that is freely mounted relative to the sensor element 1 and is arranged in particular in parallel with the measuring surface 1.2. The cover 1.4 can be fixed, for example, to the surface 1.3 of the body, but can be moved relative to the sensor element 1 and in particular to the measuring surface 1.2. A user thus grips the outer surface of the cover 1.4, but the cover 1.4 is connected to the individual sensor elements 1.3 so that the force exerted on the cover 1.4 is transmitted to the individual sensor elements 1.3 via the back of the cover 1.4. The virtual point 1.2 is at a distance from the outer surface of the cover 1.4 in the measuring surface 1.2, as a result of which not only the three force components Fx, Fy, Fz can be determined in three spatial directions, but the effective torques Mx, My, Mz as well.

Figure 4:
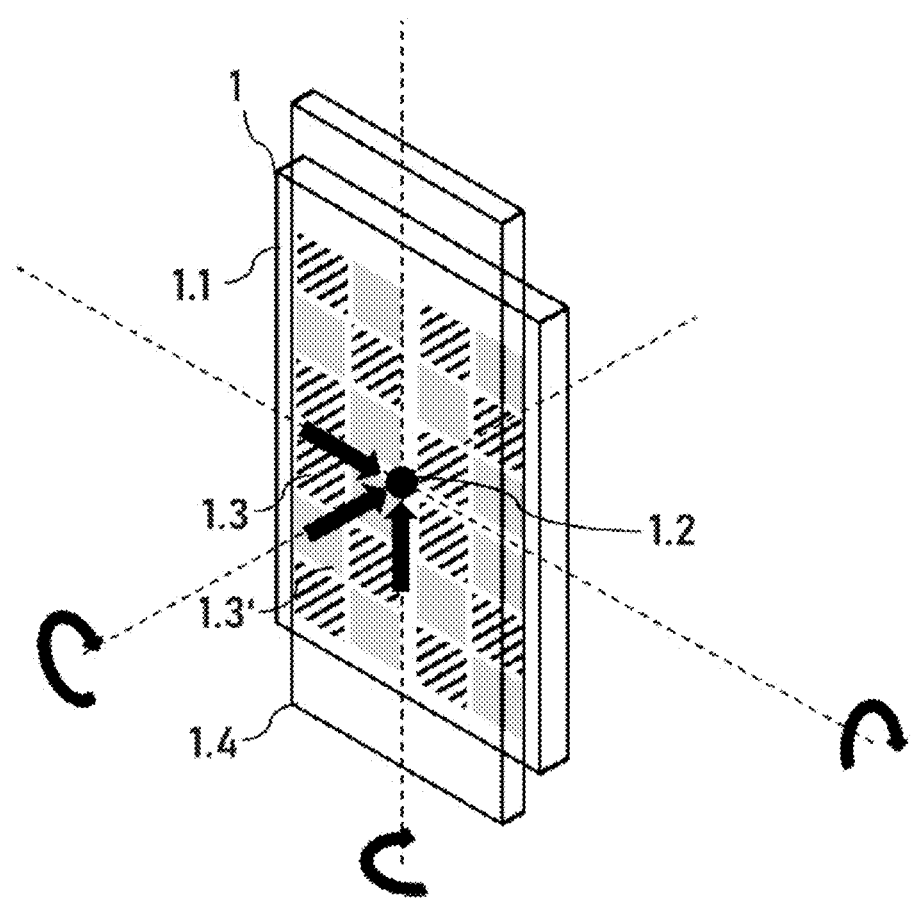
FIG. 4 is a schematic perspective view of an alternative embodiment of a device according to the invention with a sensor element.

In a method for determining, in at least three spatial directions, a force acting on the body 3, in particular a manipulator, with a sensor element 1 mounted on the surface 3.1 of the body 3, in particular according to FIG. 4, which element has at least one individual sensor element 1.3, which is used to determine an individual force in three spatial directions, or at least three individual sensor elements which are designed to determine an individual force in one direction, and a cover 1.4 that is freely mounted relative to the sensor element 1, and an evaluation/control unit 6, the following steps can be carried out: Firstly, each individual force acting on each individual sensor element 1.3 is determined. Then, the force acting on the sensor element 1, 2 is calculated in three spatial directions by projecting the individual forces onto a virtual point 1.2 of the sensor element 1, 2, taking into account the distance between cover 1.4 and measuring surface 1.1.

FIG. 1 shows the sensor elements 1, 2 as planar sensor elements 1, 2 which are shown tangentially to the curved surface 3.1 of the body 3 in a non-realistic way for the sake of simplicity of the drawing. The sensor elements 1, 2 preferably adapt to the surface 3.1 of the body 3. In a particularly advantageous manner, the sensor elements 1, 2 can be made of a flexible material. Advantageously, the sensor elements 1, 2 can be applied to the body 3 in the manner of an artificial, tactile skin. A large number of sensor elements 1, 2 can be arranged on the surface 3.1 of the body 3 and in particular can cover a large part of the surface 3.1, preferably the entire surface 3.1, of the body 3.

Figure 2:
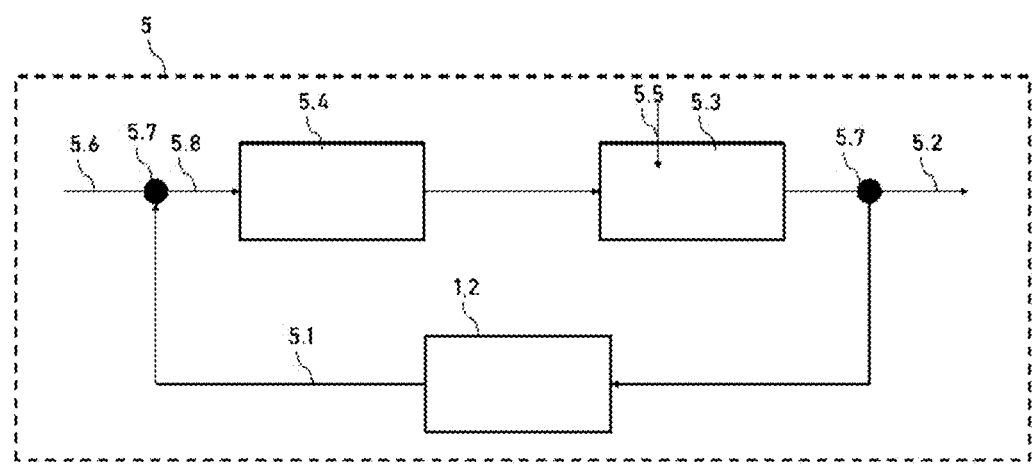
FIG. 2 is a schematic representation of a controller of the device according to FIG. 1.

To control the movement of the body 3, a manipulated variable is preferably determined based on the force acting on the body, which the drive unit 7 converts into a corresponding movement of the body 3 in the direction of the acting force. A controller 5 is preferably provided, in particular in the evaluation/control unit 6, which is shown schematically in FIG. 2. The controller 5 is intended to carry out a subsequent movement of the body 3 in the direction of a force imbalance on the basis of the change in the force balance of the body 3. To this end, the controller 5 can comprise a controlled system 5.3 and a control device 5.4, with the control device 5.4 receiving a control difference 5.8 as an input value, which difference results from an actual value 5.1 and a target value 5.6 in a comparing element 5.7. The actual value 5.1 corresponds in particular to the force acting on body 3, which was determined using sensor elements 1, 2. The target value 5.6 can be defined, for example, by the balance of forces. As a result, the controlled system 5.3 delivers a controlled variable 5.2 which can specify the manipulated variable for the drive unit 7. Disturbance variables 5.5 can be taken into account in the controlled system 5.3. The movement of the body that is then carried out can be, for example, a linear movement or a rotary movement. The center of the movement can be placed at any point of the body 3 by a kinematic transformation, for example at the virtual point 4, but also at other points. The evaluation/control unit 6 and the drive unit 7 make it possible to determine one or more spatial directions, and therefore specific movements can be carried out in desired spatial directions.

Subsequent to each of the methods described for determining the force acting on the body 3, the forces acting on the body can then, for example, be introduced into the controller 5 as actual values 5.1, the actual values 5.1 can be compared with the target value 5.6, and a manipulated variable for movement control for achieving the target value 5.6 can be determined in order to provide a method for controlling the movement of the body 3. In this method for controlling the movement of the body 3, disturbance variables 5.5, in particular in the controlled system 5.3, can also be taken into account in the controller 5.

Data and signal transmission between all components can be wired or wireless.

In each of the calculations described, all of the individual sensor elements 1.3 can be used for the evaluation. There is also the possibility of dividing the individual sensor elements 1.3 into two groups of individual sensor elements 1.3', 1.3", it being possible to evaluate the group of the individual sensor elements 1.3', which is shown in FIG. 1 without hatching for illustration purposes, independently of the group of the individual sensor elements 1.3", which is shown in FIG. 1 with hatching for illustration purposes, for example, to allow for a redundant evaluation. The individual sensor elements 1.3', 1.3" in each group are preferably arranged in a grid or a polar arrangement, with the grid or polar arrangements being arranged in particular in an interlocking manner, for example in the manner of a chess board (cf. FIG. 1 or FIG. 4). If there are several sensor elements 1, 2, a separate and/or independent evaluation of each sensor element 1, 2 is also possible in order to be able to carry out an additional plausibility check and, for example, to check whether a force is applied to each of the sensor elements 1, 2 and/or to allow for further redundancy.

In each of the methods described for determining a force acting on the body 3, the force acting on the body can thus be determined independently of one another by means of two groups of individual sensor elements 1.3', 1.3".

Figure 3:
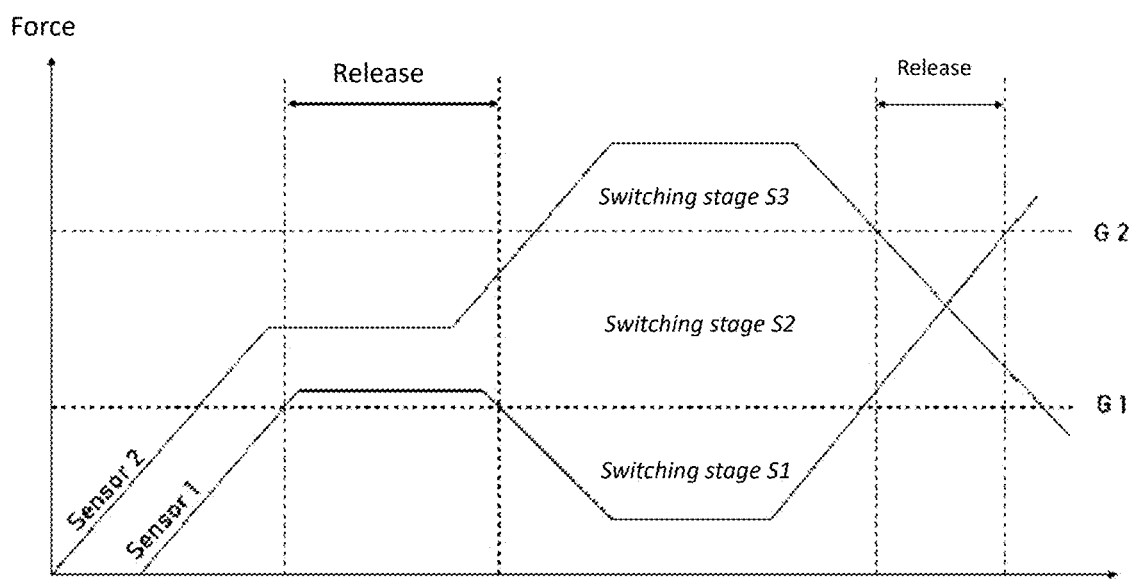
FIG. 3 is a schematic representation of release switching stages for the device according to FIG. 1.

Further safety-relevant functions can be implemented by suitable evaluation of the individual forces acting on the sensor elements 1, 2 and in particular on the individual sensors 1.3. Typical safety-relevant release switches for movements of the body 3, such as a dead man's switch or a confirmation switch, can have three switching stages, namely a switching stage S1, in which the switch is not actuated, a switching stage S2, in which a movement of the body 3 is released, and a switching stage S3, in which an emergency stop takes place. For this purpose, a minimum force value G1 and a maximum force value G2 can be defined as the lower and upper switching thresholds, the switching stage S1 being at a force below the minimum force value G1, the switching stage S2 being at a force between the minimum force value G1 and the maximum force value G2, and the switching stage S3 being at a force above the maximum force value G2 (see FIG. 3, in which an example of the amount F of the forces acting on the sensor elements 1, 2 are plotted as a function of time t). For example, the movement of the body 3 can be released if the amount F of the force acting on the sensor element 1, 2 is in the range of the switching stage S2 for one of the sensor elements 1, 2. The safety function is improved if, as shown in FIG. 3, the movement of body 3 is released when for both sensor elements 1, 2 the amount F of the force acting on sensor element 1, 2 is in the range of switching stage S2. In an example of a method for controlling the body 3, the force acting on the body 3 can then firstly be determined using the sensor elements 1, 2, then the determined force, in particular the amount F of the averaged force, are compared with a predefined minimum force value G1 and/or a maximum force value G2, and the movement of the body 3 is released if the determined force or the amount F of the determined force is greater than the minimum force value G1 and/or less than the maximum force value G2.

Figure 5:
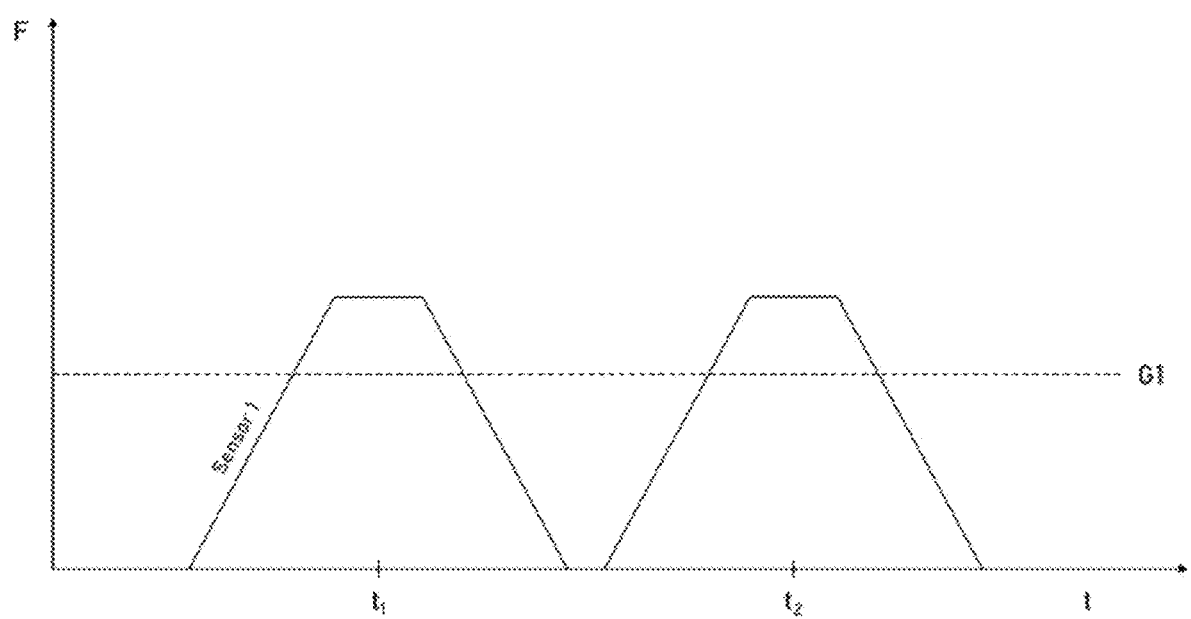
FIG. 5 is a schematic representation of a pattern of the force acting on the body 3 for a control command.

In one embodiment of the invention, patterns of the force acting on the body 3 for control commands can be stored in the evaluation/control unit 6, the patterns representing force profiles as a function of the time t. The force acting on the body 3 as a function of time t, in particular the amount F of the force acting on the body 3 as a function of time t, can be compared with the stored patterns in order to identify such patterns and subsequently execute the corresponding control command. FIG. 5 shows an example of a force profile in which the sensor element 1 is tapped twice. The force maxima occur at the times t1 and t2. If, for example, the time interval t2−t1 is less than a time difference specified in the stored pattern and the force maxima exceed a minimum limit value G1 specified in the stored pattern, the pattern can be recognized and the corresponding control command which is linked to the pattern and correspondingly stored in the evaluation/control unit can be executed, for example, the current position of the body 3, such as an arm of a manipulator, can be stored or operation of accessories attached to the body 3 such as an input field are enabled.

Therefore, in a method for controlling the body 3, in particular a manipulator, therefore, patterns of the force acting on the body 3 for input and/or control commands can be detected after determining the force acting on the body 3, in particular the amount F of the force acting on the body 3, as a function of time t.

LIST OF REFERENCE NUMERALS

1 Sensor element
1.1 Measuring surface
1.2 Virtual point
1.3 Individual sensor element
1.3' Individual sensor element
1.3" Individual sensor element
1.4 Cover
2 Sensor element
1.1 Measuring surface
2.1 Virtual point
3 Body
3.1 Surface
4 Virtual point
5 Controller
5.1 Actual value
5.2 Controlled variable
5.3 Controlled system
5.4 Control device
5.5 Disturbance variable
5.6 Target value
5.7 Comparing element
5.8 Control difference
6 Evaluation/control unit
7 Drive unit
10 Device
A Distance
a Distance
b Distance
F Force
Fx Force
Fv Force
Fz Force
Mx Torque
My Torque
Mz Torque
t Time
S1 Switching stage
S2 Switching stage
S3 Switching stage
G1 Minimum force value
G2 Maximum force value

The invention claimed is:

1. A device for determining, in at least three spatial directions (Fx, Fy, Fz, Mx, My, Mz), a force acting on a manipulator, the device comprising
at least one sensor element (1, 2) for attaching to the surface (3.1) of the body (3), which comprises at least three individual sensor elements (1.3), each individual sensor element (1.3) being designed to determine an individual force in one direction, or which comprises at least one individual sensor element (1.3) which is designed to determine an individual force in three spatial directions; and an evaluation/control unit (6) which records the individual force determined by each individual sensor element (1.3) and is designed to measure the force acting on the sensor element (1, 2) in at least three spatial directions (Fx, Fy, Fz, Mx, My, Mz) by projecting the individual forces onto a virtual point (1.2, 2.2) of the sensor element (1, 2).

2. The device according to claim 1, characterized in that each sensor element (1, 2) comprises at least 15 individual sensor elements (1.3).

3. The device according to claim 1, characterized in that the individual sensor elements (1.3) are arranged in a grid or a polar arrangement.

4. The device according to claim 1, characterized in that the individual sensor elements (1.3) of each sensor element (1, 2) has at least two groups of individual sensor elements (1.3', 1.3") which can be evaluated independently of one another.

5. The device according to claim 1, characterized in that the individual sensor elements (1.3', 1.3") of each group are each arranged in a grid or a polar arrangement, the grids or polar arrangements, arranged in an interlocking manner in a a chessboard arrangement.

6. The device according to claim 1, characterized in that the device comprises at least two sensor elements (1, 2) arranged at a distance (A) from one another on two opposite sides of the surface (3.1) of the body (3).

7. The device according to claim 6, characterized in that the sensor elements (1, 2) can be evaluated independently of one another.

8. The device according to claim 1, characterized in that the sensor element (1) has a cover (1.4) which is freely mounted relative to the sensor element (1).

9. The device according to claim 1, characterized in that the sensor element (1, 2) is made of a flexible material which can be applied to the body (3) in the manner of a skin.

10. The device according to claim 1, characterized in that the evaluation/control unit (6) comprises a controller (5) that introduces the force acting on the manipulator as an actual value (5.1).

11. An industrial robot or cobot, with a device (10) according to claim 1, wherein the at least two sensor elements (1, 2), are arranged on the surface (3.1) of the body (3).

12. The industrial robot according to claim 11, characterized in that the sensor elements (1, 2) are arranged on the surface (3.1) of the body (3), the sensor elements (1, 2) made of a flexible material applied in the manner of a skin on the body (3).

13. A method for determining, in at least three spatial directions (Fx, Fy, Fz, Mx, My, Mz), a force acting on a manipulator, comprising at least one sensor element (1, 2) mounted on the surface (3.1) of the body (3), which element comprises at least three individual sensor elements (1.3), each individual sensor element (1.3) being designed to determine an individual force in one direction, or which comprises at least one individual sensor element (1.3) which is designed to determine an individual force in three spatial directions is, and an evaluation/control unit (6), with the steps:
  determining each individual force acting on each individual sensor element (1.3); and
  calculating the force acting on the sensor element (1, 2) in at least three spatial directions (Fx, Fy, Fz, Mx, My, Mz) by projecting the individual forces onto a virtual point (1.2, 2.2) of the sensor element (1, 2).

14. The method for determining a force acting on a body according to claim 13, characterized in that at least two sensor elements (1, 2) are arranged on the surface (3.1) of the body (3) at a distance (A) from one another, the following steps being carried out:
  determining each individual force acting on each individual sensor element (1.3) for each sensor element (1, 2);
  calculating the force acting on the sensor element (1, 2) in at least three spatial directions (Fx, Fy, Fz, Mx, My, Mz) by projecting the individual forces onto a virtual point (1.2, 2.2) of the sensor element (1, 2) for each sensor element (1, 2); and
  calculating the forces (Fx, Fy, Fz) and torques (Mx, My, Mz) acting on the body (3) by projecting the forces acting on the sensor elements (1, 2) onto a virtual point (4) of the body (3), spaced apart from the sensor elements (1, 2).

15. The method according to claim 13, characterized in that the force acting on the body (3) is determined independently of one another by means of two groups of individual sensor elements (1.3', 1.3").

16. A method for controlling a manipulator, with the steps: determining the force acting on the body (3) using a method according claim 13, comparing the determined force (F) with a predetermined minimum force value (G1) and/or a maximum force value (G2), and releasing the movement of the body (3) if the determined force (F) is greater than the minimum force value (G1) and/or less than the maximum force value (G2).

17. A method for controlling a manipulator, with the steps:
  determining the force acting on the body (3) using a method according claim 13, as a function of time, and recognizing patterns of the force acting on the body (3) for input and/or control commands.

18. A method for controlling the movement of a manipulator, with the steps:
  determining the force acting on the body (3) using a method according to claim 13;
  introducing the force acting on the body (3) into a controller (5) as an actual value (5.1);
  comparing the actual value (5.1) with a target value (5.6) of the controller (5); and
  determining a manipulated variable (5.2) for movement control in order to achieve the target value (5.6).

19. The method for controlling the movement of a body according to claim 18, characterized in that disturbance variables (5.5) are taken into account in the controller (5).

* * * * *